July 31, 1928.  
H. W. DRAKE  
1,679,326  
POTENTIAL INDICATING SYSTEM  
Filed Nov. 20, 1924     2 Sheets-Sheet 1

Inventor  
H. W. Drake  
By  
Eugene E. Brown  
Attorney

July 31, 1928.  H. W. DRAKE  1,679,326

POTENTIAL INDICATING SYSTEM

Filed Nov. 20, 1924  2 Sheets-Sheet 2

Inventor
H. W. Drake

By Eugene E. Brown
Attorney

Patented July 31, 1928.

UNITED STATES PATENT OFFICE.

HERBERT W. DRAKE, OF EAST ORANGE, NEW JERSEY, ASSIGNOR TO THE WESTERN UNION TELEGRAPH COMPANY, OF NEW YORK, N. Y., A CORPORATION OF NEW YORK.

POTENTIAL-INDICATING SYSTEM.

Application filed November 20, 1924. Serial No. 751,178.

The present invention relates to indicating systems and arrangements whereby accurate indication or records of electrical potentials applied to transmission lines may be obtained at points electrically remote from the points of application of the potentials, independently of potential variations due to load or working conditions at points on the circuit beyond the indicating apparatus.

Although the fundamental principles underlying the invention are adapted for the measurement of generator potentials at points along a power transmission remote from the generator, the invention is especially useful in telegraph or signalling circuits for the purpose of operating home recording instruments, and for operating supervisory instruments at repeating stations in duplex, quadruplex and like systems.

In telegraphy, it is common practice to apply such home recording and supervisory recording instruments in derived or leak circuits at transmitting and repeating stations. It is found however, in systems operating to transmit a plurality of messages simultaneously in opposite directions over a single line that the variations in line currents due to simultaneous application of varying potentials at opposite ends of the line produce wide variations of current in the derived or leak circuits. These variations in the leak circuit cause serious distortion in the signals indicated by the leak circuit instruments.

An object of the invention is to provide means for eliminating this distortion of signals in leak circuits at telegraph transmitting and repeating stations so that an accurate record of outgoing messages may be made on recording instruments in the leak circuits.

In power transmission circuits it is frequently desirable to determine the potential of the generating source by measurements taken at the end of a transmission line remote from the source, between a variable load and the generator. The potentials measured in the usual manner will vary with the load due to variations in line drop.

Another object of the invention is the provision of means to compensate for potential variations due to working conditions so that an accurate measurement of transmitting potentials may be obtained.

Further objects of the invention will appear in the following detailed description of preferred embodiments thereof, of which:

Figure 1:
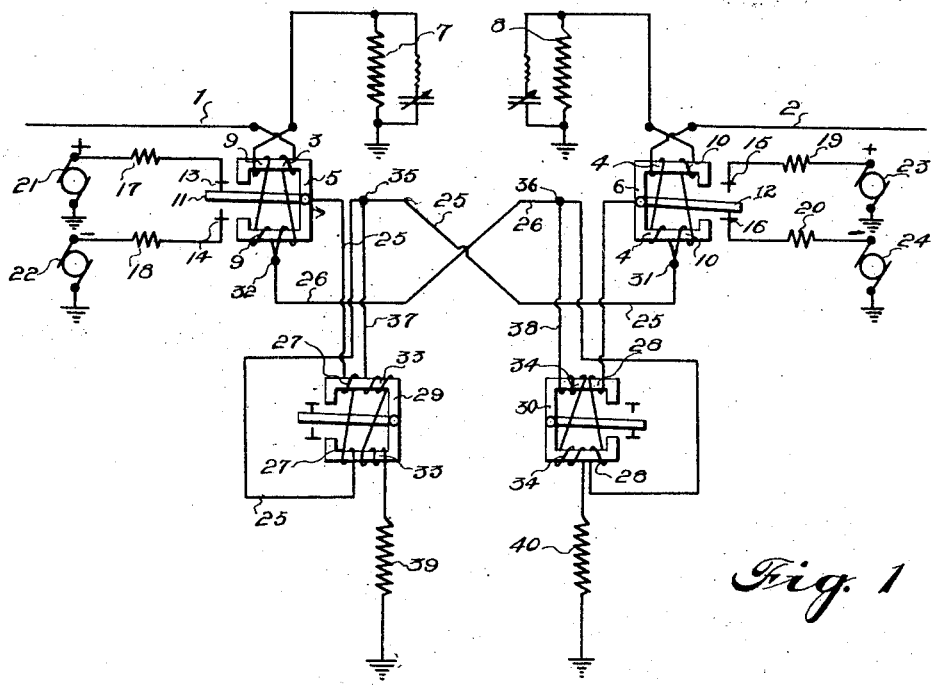
Figure 1 is a circuit diagram showing the application of an embodiment applied to a telegraph repeater.

Referring to Figure 1, lines 1 and 2 are connected to windings 3 and 4 of receiving or repeating relays 5 and 6. Artificial lines 7 and 8 are connected to windings 9 and 10 of relays 5 and 6. Tongues 11 and 12 of relays 5 and 6 are actuated between contacts 13, 14, 15 and 16 respectively, which in turn are connected in series through tap resistance 17, 18, 19 and 20, to the positive and negative poles of sources of electrical energy 21, 22, 23 and 24. Tongues 11 and 12 are connected by conductors 25 and 26, through windings 27 and 28 of leak or recording relays 29 and 30 to the windings of relays 5 and 6 at points 31 and 32. Windings 33 and 34 of relays 29 and 30 are connected in series from points 35 to 36 by conductors 37 and 38 through leak resistances 39 and 40 to ground.

The windings 27 and 33 of relay 29, are so proportioned and applied that variations of potential at point 35, due to potential variations caused on line 2 will produce equal and opposing balanced magneto-motive forces in relay 29 while potentials applied from generators 21 and 22 due to signals received from line 1 will pass through windings 27 and 33 in a manner to cause adding of the magnetomotive forces developed. The proper ratio of turns for windings 27 and 33 to establish this relation is directly proportional to the ratio of the sum of the resistances 17 and 27 to the sum of the resistances 33 and 39. In a similar manner windings 28 and 34 are so proportioned and applied to relay 30 that currents due to potential variations from line 1 at point 36 will produce equal and opposed magnetic effects therein, while the magnetic effects of currents due to potential variations applied to tongue 12 will add.

In practice the resistances of leads, contacts and the generators may be disregarded, and the relation of turns in windings 27, 28 and 33 and 34 may be determined by choosing appropriate values in accordance with the following relation:—

$$N_a = \frac{N_m(R_t \& R_a)}{R_1 \& R_m}$$

in which—

$N_a$ = number of turns in winding 27 or 28.
$N_m$ = number of turns in winding 33 or 34.
$R_a$ = resistance of winding 27 or 28.
$R_m$ = resistance of winding 33 or 34.
$R_t$ = resistance of winding 17, 18, 19, or 20.
$R'$ = resistance of winding 39 or 40.

In operation of the system shown in Figure 1 the magnetic effects in the leak instruments due to the outgoing currents will be directly proportional to the potentials applied to the transmitting tongues, and will be independent of variations due to incoming signals to be transmitted in the opposite direction. The result is that the signals received on the leak relays will be accurate and undistorted.

Figure 2:
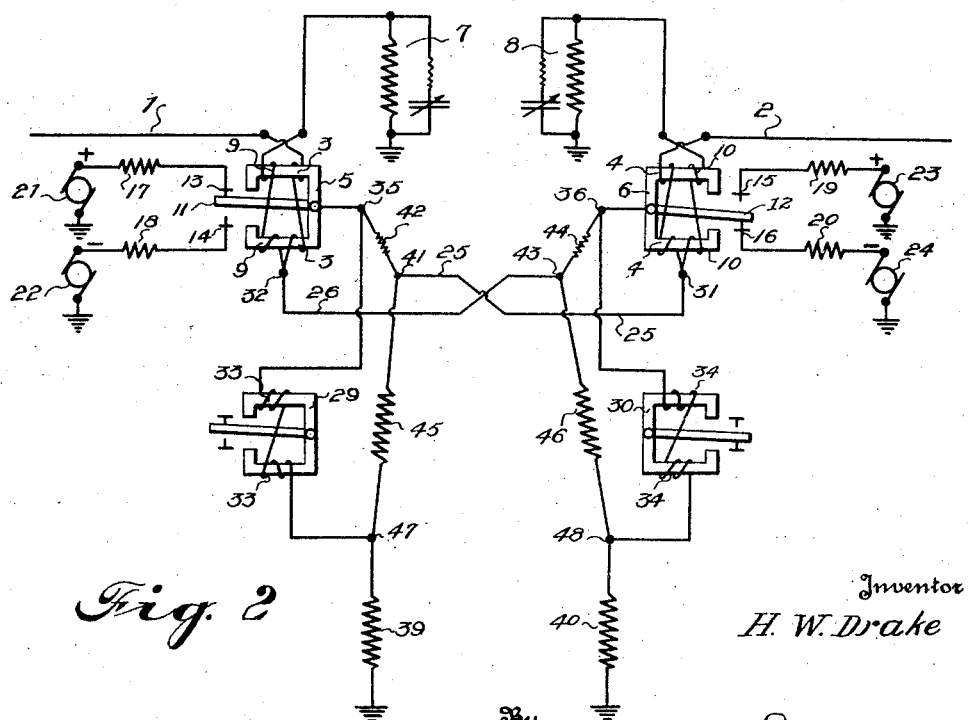
Figure 2 is a circuit diagram showing a modified form applied to a telegraph repeater.

In Figure 2 a method of balancing out the disturbing influence is utilized in which the necessity for two sets of windings on the leak relays is obviated. In this form, windings 27 and 28 are removed from relays 29 and 30 respectively. Connected between point 35 and point 41 on conductor 25 is a resistance 42; and connected between point 36 and point 43 on conductor 26 is a resistance 44. Resistances 45 and 46 are connected from points 41 and 43 in shunt around relays 29 and 30 respectively to resistance 39 and 40 at points 47 and 48. This arrangement forms a bridge in each transmitting circuit with relation to incoming potentials in the cross-wire of which the recorders 29 and 30 are connected. By choosing the resistances so that the ratio of resistances 42 to 45 and 44 to 46 is equal to the ratio of resistances from points 35 and 36 through tongues 11 and 12 to resistances 39 and 40, potential variations at points 41 and 43 due to incoming signals will produce no effect in the relays 29 and 30 because of the balance established in the bridge. As the contact, lead, and generator resistances are practically negligible, the properly balanced relation will exist when the values are chosen so that:

$$\frac{a}{b} = \frac{R_t}{R_1}$$

in which—

$a$ = resistance of 42 or 44.
$b$ = resistance of 45 or 46.
$R_t$ = resistance of 17, 18, 19 or 20.
$R_1$ = resistance of 39 or 40.

The signals received in the relays 29 and 30 will accordingly correspond to the proper outgoing currents unaffected by the incoming currents.

Figure 3:
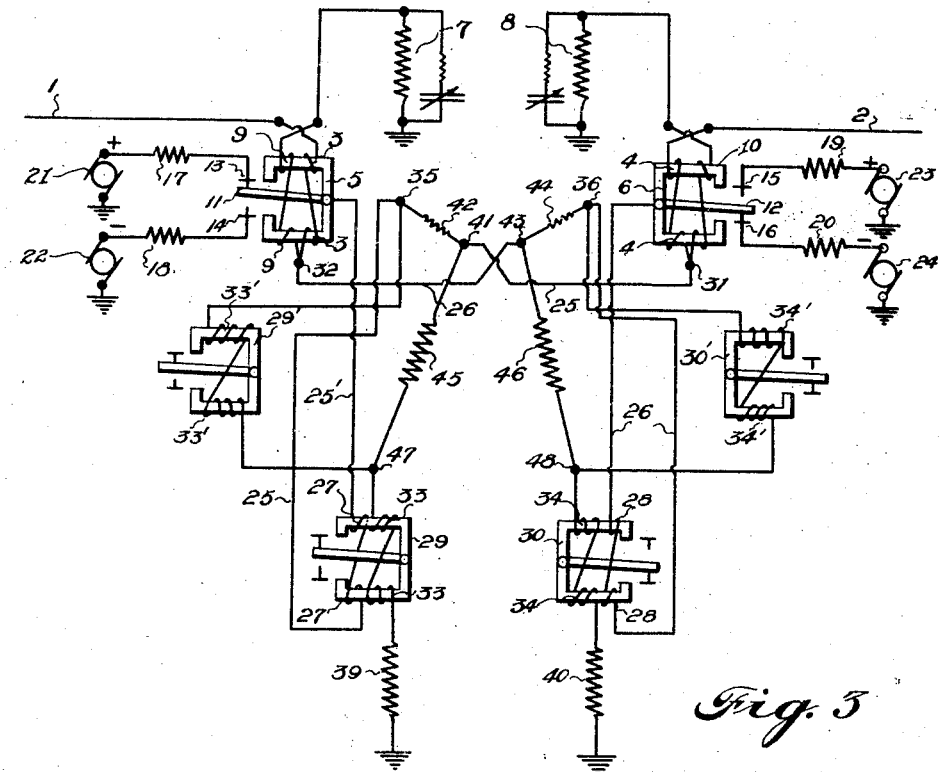
Figure 3 is a circuit diagram showing a combination of the forms set forth in Figs. 1 and 2.

In Figure 3 a combination of the forms of Figures 1 and 2 is shown which is particularly useful where it is desired to operate two leak instruments such as a relay and a recorder for each set of outgoing signals. Recorders 29' and 30' are connected in a bridge exactly as is shown and described in Figure 2. Windings 27 and 28 of relays 29 and 30 are connected in conductors 25 and 26 exactly as shown and described in Figure 1. Instead of being connected to points 35 and 36 as shown in Figure 1 windings 33 and 34 of relays 29 and 30 are connected between point 47 and resistance 39, and point 48 and resistance 40 respectively. The ratio of resistances 42 to 45 is made the same as the ratio of the sum of the resistance of windings 33 and resistance 39, to the resistance 17 or 18; and the ratio of resistances 44 to 46 is made the same as the ratio of the sum of the resistance of windings 34 and resistance 40, to the resistance of 19 or 20. The proportions and arrangement of windings 27, 33, 28 and 34 of relays 29, and 30 will be the same as set forth in connection with Figure 1. As the bridge is balanced the potential of incoming currents at points 35 and 47 will be the same; and the magnetic effects due to incoming currents in relays 29 and 30 will be balanced. All of the relays will accordingly respond to outgoing currents only and will be undisturbed by variations due to incoming currents.

Although Figures 1 to 3 have been shown as repeating stations, it will be obvious that the invention may be applied to leak relays and recorders used as home recorders at transmitting stations.

Figure 4:
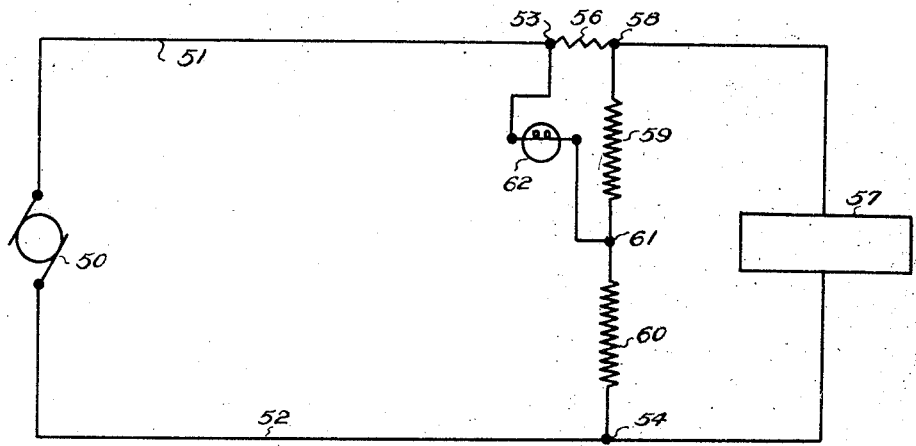
Figure 4 is a circuit diagram of one form of the invention applied to a power transmission circuit.

Figure 4 shows the bridge form of invention as applied to a power transmission system. A generator 50 transmits over lines 51 and 52 to points 53 and 54. A resistance 56 is connected in series with line 51 and a load 57 of any usual kind, such for example as lights and motors, is connected in series with the lines 51 and 52 between points 54 and 58. Connected in shunt to load 57 between points 54 and 58 are resistances 59 and 60, and connected between points 53 and 61 is a recording instrument 62. The value of resistances 56, 59 and 60 is so chosen with respect to the resistance between points 53 and 54 through the generator 50 that the ratio of resistance 56 to resistance 59 is equal to the ratio of the resistance between points 53 and 54 over lines 51 and 52 through generator 50, to resistance 60. Under these conditions instrument 62 will be connected in the cross wire of a balanced bridge, and potential variations at points 54 and 58 due to load changes will not affect the instrument. The current flowing through the instrument will accordingly be directly proportional to the voltage of the generator independently of load variations, and the instrument 62 may be calibrated to indicate the generator voltage directly. It will also be obvious that a differential balance with respect to load variations may be established in the instrument 62 by utilizing the principles disclosed in connection with Figure 1.

In the above description of Fig. 4, only the resistance of the bridge arms and other portions of the transmission circuit has been referred to but it will be understood that in practice these various portions of the circuit have other electrical characteristics, such as capacity and inductance in addition to their resistance.

Having shown and described preferred embodiments of the invention, what is desired to be secured by Letters Patent and is claimed as new, is:—

1. A transmission system, comprising, a main line, a source of electrical energy adapted to be connected thereto, an indicating instrument electrically remote from and responsive to potential variations of said source, and compensating means for said instrument to compensate for the effect of disturbing potential variations other than the potential variations of said source, comprising a differential winding for said instrument connected in the main line.

2. A telegraph system, comprising a line, means for transmitting outgoing message impulses over said line, means for receiving incoming message impulses from said line, means interposed between said transmitting means and said receiving means responsive to said outgoing impulses, and means for balancing the disturbing effect of incoming impulses on said last mentioned means.

3. A telegraph system, comprising a main line, means for transmitting outgoing message impulses over said main line, means for receiving incoming message impulses from said main line, a leak circuit interposed between said transmitting and said receiving means, an electroresponsive means responsive to said outgoing impulses in said leak circuit, and means for balancing disturbing effects of incoming impulses in said electroresponsive means.

4. The combination as set forth in claim 3, in which said last mentioned means comprises a differential winding for said electroresponsive means connected in said main line circuit.

5. The combination as set forth in claim 3, in which said last mentioned means comprises a bridge circuit arranged to balance the effect of incoming impulses on said electroresponsive means.

6. The combination as set forth in claim 3, in which said last mentioned means comprises a bridge circuit arranged to balance the effect of incoming impulses on said electroresponsive means, together with a second electroresponsive means in said leak circuit, and a differential winding for said second electroresponsive means connected in said main circuit.

7. A transmission system, comprising a main line, a source of electrical energy adapted to be connected thereto, an indicating instrument electrically remote from and responsive to potential variations of said source, and compensating means for said instrument to compensate for the effect of disturbing potential variations other than the potential variations of said source, comprising impedance connected in a network with said main line so as to give compensating effects when traversed by currents from other sources.

In testimony whereof I affix my signature.

HERBERT W. DRAKE.